US012660016B2

(12) United States Patent
Shin

(10) Patent No.: US 12,660,016 B2
(45) Date of Patent: Jun. 16, 2026

(54) IMAGE DISPLAY APPARATUS AND OPERATION METHOD THEREFOR

(71) Applicant: LG ELECTRONICS INC., Seoul (KR)

(72) Inventor: Byounghyun Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 441 days.

(21) Appl. No.: 17/755,868

(22) PCT Filed: Nov. 13, 2019

(86) PCT No.: PCT/KR2019/015476
§ 371 (c)(1),
(2) Date: May 10, 2022

(87) PCT Pub. No.: WO2021/095919
PCT Pub. Date: May 20, 2021

(65) Prior Publication Data
US 2022/0394789 A1    Dec. 8, 2022

(51) Int. Cl.
*H04W 76/14*    (2018.01)
*G09G 5/00*    (2006.01)
*H04W 88/08*    (2009.01)

(52) U.S. Cl.
CPC ............ *H04W 76/14* (2018.02); *G09G 5/003* (2013.01); *H04W 88/08* (2013.01); *G09G 2370/02* (2013.01)

(58) Field of Classification Search
CPC ..... H04W 76/14; H04W 76/11; H04W 88/08; H04W 84/12; G09G 5/003;
(Continued)

(56) References Cited

U.S. PATENT DOCUMENTS

| | | | |
|---|---|---|---|
| 2016/0011824 A1* | 1/2016 | Ishimura | ............... H04W 76/19 |
| | | | 358/1.15 |
| 2017/0223579 A1* | 8/2017 | Lee | ..................... H04W 36/035 |

FOREIGN PATENT DOCUMENTS

| | | | | |
|---|---|---|---|---|
| CN | 103716903 B | * 11/2017 | ............ | H04W 84/20 |
| KR | 1020160031353 | 3/2016 | | |

(Continued)

OTHER PUBLICATIONS

PCT International Application No. PCT/KR2019/015476, International Search Report dated Aug. 7, 2020, 2 pages.

*Primary Examiner* — Jianye Wu
(74) *Attorney, Agent, or Firm* — LEE, HONG, DEGERMAN, KANG & WAIMEY

(57)      ABSTRACT

The present disclosure relates to an image display apparatus and an operating method thereof. The image display apparatus according to an embodiment of the present disclosure includes a display configured to display an image; an interface unit configured to have at least one communication module, and to transmit and receive a signal including data; and a controller, wherein the controller, through the interface unit, transmits a request signal including data for a specific communication channel to the outside, checks whether a response signal to the request signal is received in the specific communication channel, and when the response signal is received in the specific communication channel, performs a communication connection of Wi-Fi Direct method with an external device that transmitted the response signal, based on the response signal. In addition, various embodiments are possible.

19 Claims, 13 Drawing Sheets

(58) Field of Classification Search
CPC ......... G09G 2370/02; H04N 21/04126; H04N
21/041265; H04N 21/43615; H04N
21/42202; H04N 21/4363; H04N 21/485;
H04N 21/436
See application file for complete search history.

(56) References Cited

FOREIGN PATENT DOCUMENTS

| | | |
|---|---|---|
| KR | 1020160053594 | 5/2016 |
| KR | 1020180049525 | 5/2018 |
| KR | 1020180099267 | 9/2018 |
| KR | 1020190058422 | 5/2019 |

* cited by examiner

10

IMAGE DISPLAY APPARATUS AND OPERATION METHOD THEREFOR

CROSS-REFERENCE TO RELATED APPLICATIONS

This application is the National Stage filing under 35 U.S.C. 371 of International Application No. PCT/KR2019/015476, filed on Nov. 13, 2019, the contents of which are all incorporated by reference herein in its entirety.

TECHNICAL FIELD

The present disclosure relates to an image display apparatus and an operating method thereof.

BACKGROUND ART

An image display apparatus is a device having a function of displaying an image that a user can watch. For example, the image display apparatus may include a Television (TV) including a liquid crystal display (LCD) using liquid crystal or an OLED display using an organic light emitting diode (OLED).

Such an image display apparatus can also transmit and receive data to and from various electronic devices by wire/wireless. For example, there is a Screen Mirroring function that enables an image displayed on a screen of mobile terminal is displayed on the image display apparatus intactly, based on data received from a mobile terminal that is communicatively connected through a Wi-Fi Direct method which is one of short-distance communication methods.

As described above, in order for the image display apparatus to wirelessly communicate with an external device such as a mobile terminal, a communication connection between the devices must be established, and in order to establish a communication connection, it is necessary to first search whether an external device as a communication target exists in the vicinity.

However, according to a conventional method, it takes a long time to search whether an external device, which is a target for establishing a communication connection, exists in the vicinity, which causes inconvenience to a user.

DISCLOSURE

Technical Problem

It is an object of the present disclosure to solve the above and other problems.

It is another object of the present disclosure to provide an image display apparatus capable of reducing the time required to establish a communication connection with an external device, and an operating method thereof.

Technical Solution

In order to achieve the above object, an image display apparatus according to an embodiment of the present disclosure includes a display configured to display an image; an interface unit configured to have at least one communication module, and to transmit and receive a signal including data; and a controller, wherein the controller, through the interface unit, transmits a request signal including data for a specific communication channel to the outside, checks whether a response signal to the request signal is received in the specific communication channel, and when the response signal is received in the specific communication channel, performs a communication connection of Wi-Fi Direct method with an external device that transmitted the response signal, based on the response signal.

Meanwhile, a method of operating an image display apparatus according to an embodiment of the present disclosure includes transmitting a request signal including data for a specific communication channel to the outside; checking whether a response signal to the transmitted request signal is received in the specific communication channel; and performing a communication connection of Wi-Fi Direct method with an external device that transmitted the response signal, when the response signal is received in the specific communication channel.

Advantageous Effects

The effect of the image display apparatus according to the present disclosure has the following effects.

According to at least one embodiment of the present disclosure, data for a specific communication channel is transmitted to an external device by using various communication methods without searching whether an external device exists in the vicinity, and a communication connection can be established with an external device by receiving a response signal from an external device through a specific communication channel, thereby effectively shortening the time required for establishing a communication connection with the external device.

In addition, according to at least one embodiment of the present disclosure, when the image display apparatus transmits and receives Wi-Fi signals of different frequency bands simultaneously, communication with an external device and communication with an access point can be performed without deterioration of communication performance.

Further scope of applicability of the present disclosure will become apparent from the following detailed description. However, it should be understood that the detailed description and specific embodiments such as preferred embodiments of the present disclosure are given by way of illustration only, since various changes and modifications within the spirit and scope of the present disclosure may be clearly understood by those skilled in the art.

MODE FOR INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function. Accordingly, the terms "module" and "unit" may be used interchangeably.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

In addition, in the present application, although the terms first, second, etc. may be used to describe various elements, these elements should not be limited by these terms. These terms are only used to distinguish one element from another.

Figure 1:
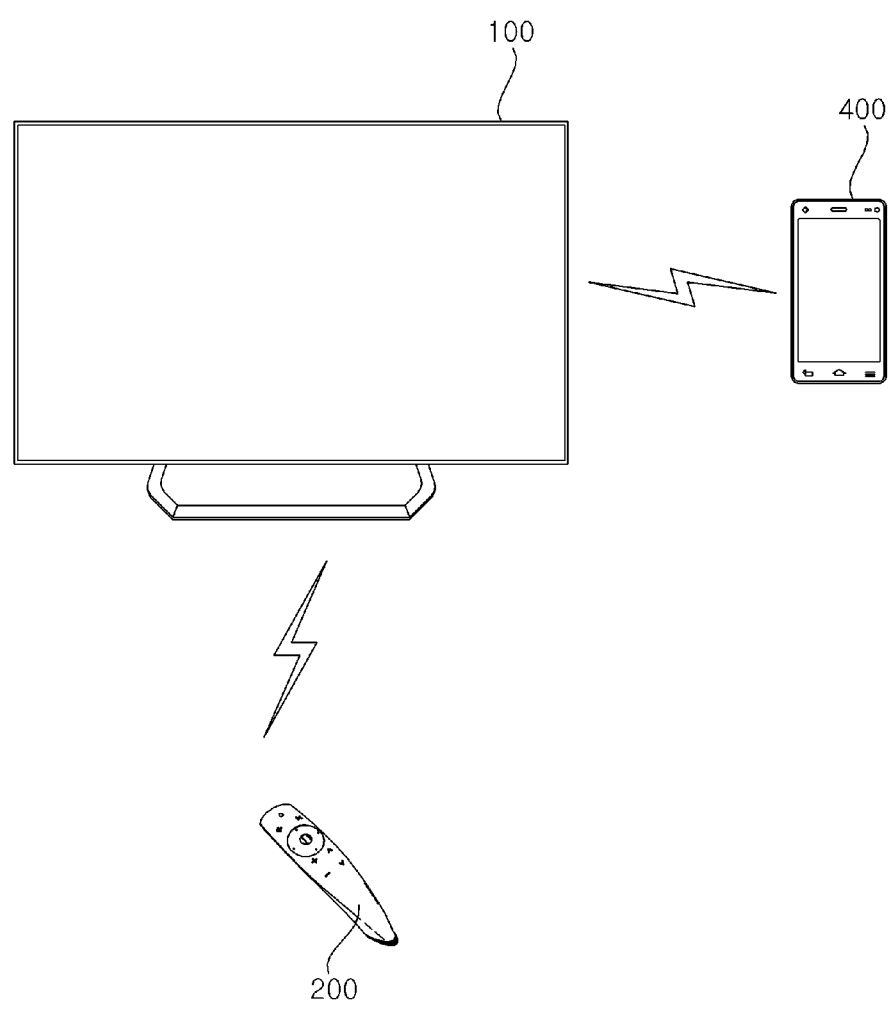
FIG. 1 is a diagram illustrating an image display system according to an embodiment of the present disclosure.

FIG. 1 is a diagram illustrating an image display system according to an embodiment of the present disclosure.

Referring to FIG. 1, an image display system 10 may include an image display apparatus 100 and/or a remote control device 200.

The image display apparatus 100 may be a device that processes and outputs an image. The image display apparatus 100 is not particularly limited as long as it can output a screen corresponding to an image signal, such as a TV, a notebook computer, and a monitor The image display apparatus 100 may receive a broadcast signal, process it, and output a signal-processed broadcast image. When the image display apparatus 100 receives a broadcast signal, the image display apparatus 100 may correspond to a broadcast receiving apparatus.

The image display apparatus 100 may receive a broadcast signal wirelessly through an antenna, or may receive a broadcast signal by wire through a cable.

For example, the image display apparatus 100 may receive a terrestrial broadcast signal, a satellite broadcast signal, a cable broadcast signal, an Internet Protocol Television (IPTV) broadcast signal, and the like.

The remote control device 200 may be connected to the image display apparatus 100 by wire and/or wirelessly to provide various control signals to the image display apparatus 100. At this time, the remote control device 200 may include a device that establishes a wired or wireless network with the image display apparatus 100 and transmits various control signals to the image display apparatus 100 through a established network, or receives a signal related to various operations processed in the image display apparatus 100 from the image display apparatus 100.

For example, various input devices such as a mouse, a keyboard, a space remote control, a trackball, and a joystick may be used as the remote control device 200. The remote control device 200 may be referred to as an external device, and hereinafter, it is clarified in advance that an external device and a remote control device can be used interchangeably if necessary.

The image display apparatus 100 may be connected to only a single remote control device 200 or may be simultaneously connected to two or more remote control devices 200, and may change an object displayed on a screen or adjust the state of a screen, based on a control signal provided from each remote control device 200.

Meanwhile, the image display system 10 may further include a mobile terminal 400. The mobile terminal 400 may include a smart phone, a notebook computer, personal digital assistants (PDA), a portable multimedia player (PMP), a wearable device (e.g., smartwatch, smart glass, a head mounted display (HMD)), etc.

The image display apparatus 100 and the mobile terminal 400 may transmit/receive a signal including data to/from each other by wire/wireless.

The image display apparatus 100 and the mobile terminal 400 may perform pairing which wirelessly establishes a communication connection with each other. For example, the image display apparatus 100 transmits a pairing request signal to the mobile terminal 100, and the mobile terminal 100 transmits a pairing response signal to the image display apparatus 100 in response to the reception of the pairing request signal, thereby establishing a communication connection.

In this case, the image display apparatus 100 and the mobile terminal 400 may establish a communication connection by using various communication methods, such as Wi-Fi Direct and Bluetooth.

The image display apparatus 100 and the mobile terminal 400 may transmit/receive data to and from each other. The image display apparatus 100 and the mobile terminal 400 may perform a screen mirroring function which enables an image displayed on the screen of the mobile terminal 400 to be displayed on the image display apparatus 100 intactly.

For example, the mobile terminal 400 may transmit a signal including data for an image displayed on the screen of the mobile terminal 400 to the image display apparatus 100, and the image display apparatus 100 may output an image displayed on the screen of the mobile terminal 400 intactly, based on the data for the image received from the mobile terminal 400.

In this case, the image display apparatus 100 may enlarge or reduce the image displayed on the screen of the mobile terminal 400 and output it, based on a resolution, a screen ratio, and the like of the image display apparatus 100.

Figure 2:
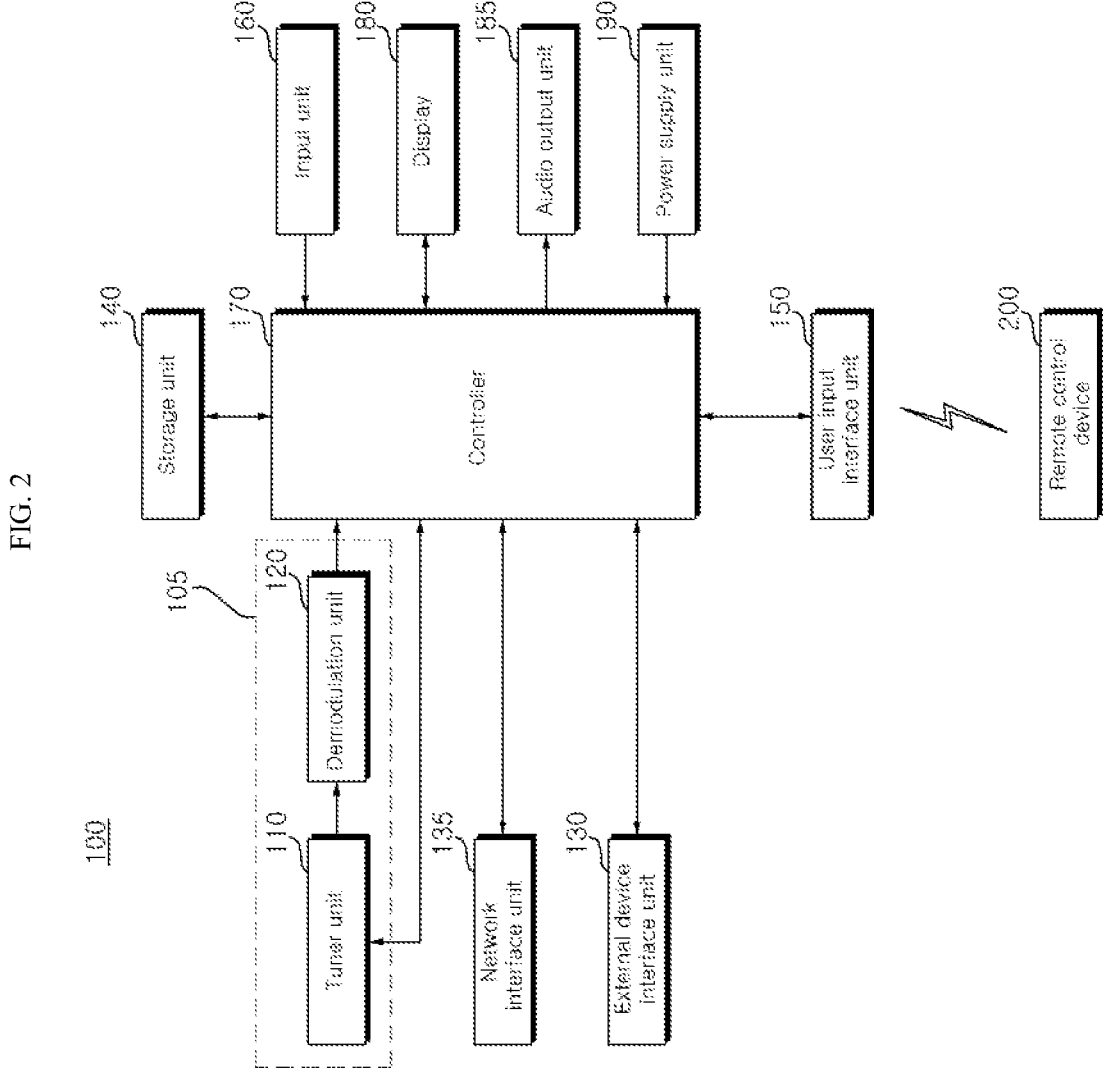
FIG. 2 is an internal block diagram of an image display apparatus of FIG. 1.

FIG. 2 is an internal block diagram of the image display apparatus of FIG. 1.

Referring to FIG. 2, the image display apparatus 100 may include a broadcast receiving unit 105, an external device interface unit 130, a network interface unit 135, a storage unit 140, a user input interface unit 150, an input unit 160, a controller 170, a display 180, an audio output unit 185, and/or a power supply unit 190.

The broadcast receiving unit 105 may include a tuner unit 110 and a demodulation unit 120.

Meanwhile, unlike the drawing, the image display apparatus 100 can include only the broadcast receiving unit 105 and the external device interface unit 130, among the broadcast receiving unit 105, the external device interface unit 130, and the network interface unit 135. That is, the image display apparatus 100 may not include the network interface unit 135.

The tuner unit 110 may select a broadcast signal corresponding to a channel selected by a user or all previously stored channels among broadcast signals received through an antenna (not shown) or a cable (not shown). The tuner unit 110 may convert the selected broadcast signal into an intermediate frequency signal or a baseband image or a voice signal.

For example, if the selected broadcast signal is a digital broadcast signal, the tuner unit 110 may convert into a digital IF signal (DIF), and if the selected broadcast signal is an analog broadcast signal, may convert into an analog baseband image or a voice signal (CVBS/SIF). That is, the tuner unit 110 may process a digital broadcast signal or an analog broadcast signal. An analog baseband image or voice signal (CVBS/SIF) output from the tuner unit 110 may be directly input to the controller 170.

Meanwhile, the tuner unit 110 may sequentially select a broadcast signal of all broadcast channels stored through a channel storage function among the received broadcast signals, and convert the selected broadcast signal into an intermediate frequency signal or a baseband image or voice signal.

Meanwhile, the tuner unit 110 can include a plurality of tuners in order to receive broadcast signals of a plurality of channels. Alternatively, a single tuner that simultaneously receives broadcast signals of a plurality of channels is also possible.

The demodulation unit 120 may receive a digital IF signal DIF converted by the tuner unit 110 and perform a demodulation operation.

The demodulation unit 120 may output a stream signal TS after performing a demodulation and a channel decoding. In this case, the stream signal may be a signal obtained by multiplexing an image signal, a voice signal, or a data signal.

The stream signal output from the demodulation unit 120 may be input to the controller 170. After performing demultiplexing and image/voice signal processing, the controller 170 may output an image through the display 180, and output a voice through the audio output unit 185.

The external device interface unit 130 may transmit or receive data to or from a connected external device. To this end, the external device interface unit 130 may include an A/V input/output unit (not shown).

The external device interface unit 130 may be connected to an external device such as a Digital Versatile Disk (DVD), Blu-ray, game device, camera, camcorder, computer (laptop), set-top box, and the like by wire/wireless, and may perform input/output operations with an external device.

In addition, the external device interface unit 130 establishes a communication network with various remote control devices 200 as shown in FIG. 1, and may receive a control signal related to the operation of the image display apparatus 100 from the remote control device 200, or transmit data related to the operation of the image display apparatus 100 to the remote control device 200.

The A/V input/output unit may receive image and voice signals of an external device.

The external device interface unit 130 may include a wireless communication unit (not shown) for short-range wireless communication with other electronic device.

Through such a wireless communication unit (not shown), the external device interface unit 130 may exchange data with an adjacent mobile terminal. In particular, the external device interface unit 130 may receive device information, executing application information, an application image, and the like, from the mobile terminal in a screen mirroring mode.

The network interface unit 135 may provide an interface for connecting the image display apparatus 100 to a wired/wireless network containing an Internet network.

For example, the network interface unit 135 may communicate with a relay device, i.e., an access point (AP) by wire/wireless, and may access a local network through the access point (AP), or may access the Internet.

The network interface unit 135 may receive content or data provided by the Internet or a content provider or network operator through a network.

Meanwhile, the network interface unit 135 may include a communication module (not shown) for connection to a wired/wireless network.

The external device interface unit 130 and/or the network interface unit 135 may include a communication module for short-distance communication such as Wireless Fidelity (Wi-Fi), Bluetooth, Bluetooth Low Energy (BLE), Zigbee, Near Field Communication (NFC), a communication module for cellular communication such as long-term evolution (LTE), LTE Advance (LTE-A), code division multiple access (CDMA), wideband CDMA (WCDMA), universal mobile telecommunications system (UMTS), and Wireless Broadband (WiBro), and the like.

Meanwhile, the communication module for Wi-Fi communication may simultaneously transmit and receive Wi-Fi signals of different frequency bands.

For example, the communication module for Wi-Fi communication may include a first circuit for transmitting and receiving a Wi-Fi signal of a 2.4 GHz band, and a second circuit for transmitting and receiving a Wi-Fi signal of a 5 GHz band.

At this time, the controller 170 may simultaneously transmit and receive the Wi-Fi signals of different frequency bands through the first circuit and the second circuit, by using a plurality of different Media Access Control Addresses (MAC addresses) for the image display apparatus 100.

For example, the controller 170 may simultaneously transmit and receive signals to and from an external device (e.g. the mobile terminal 400) through the second circuit, while transmitting and receiving signals to and from the access point (AP) through the first circuit.

The storage unit 140 may store a program inside the controller 170 for processing and controlling each signal, or may store a signal-processed image, voice, or data signal.

For example, the storage unit 140 stores application programs designed for the purpose of performing various tasks that can be processed by the controller 170, and upon request of the controller 170, may selectively provide some of the stored application programs.

The program stored in the storage unit 140, or the like is not particularly limited as long as it can be executed by the controller 170.

The storage unit 140 may perform a function for temporarily storing an image, voice, or data signal received from an external device through the external device interface unit 130.

The storage unit 140 may store information related to a certain broadcast channel through a channel storage function such as a channel map.

The storage unit 140 may store data on a history of performing a communication connection with at least one external device (e.g. the mobile terminal 400). For example, the storage unit 140 may store an identifier (e.g. a P2P device address) for at least one external device that performed a Wi-Fi Direct communication connection.

FIG. 2 shows an embodiment in which the storage unit 140 is provided separately from the controller 170, but the scope of the present disclosure is not limited thereto, and the storage unit 140 may be included in the controller 170.

The user input interface unit 150 may transmit a signal input by a user to the controller 170, or may transmit a signal from the controller 170 to the user.

For example, it may transmit/receive a user input signal such as power on/off, channel selection, and screen setting from the remote control device 200, or transmit a user input signal input from a local key (not shown) such as a power key, a channel key, a volume key, and a setting value to the controller 170, or transmit a user input signal input from a sensor unit (not shown) that senses a user's gesture to the controller 170, or transmit a signal from the controller 170 to the sensor unit.

The input unit 160 may be provided in one side of a main body of the image display apparatus 100. For example, the input unit 160 may include a touch pad, a physical button, and the like The input unit 160 may receive various user commands related to the operation of the image display apparatus 100, and may transmit a control signal corresponding to the input command to the controller 170.

The controller 170 may include at least one processor, and may control the overall operation of the image display apparatus 100 by using the included processor. Here, the processor may be a general processor such as a central processing unit (CPU). Obviously, the processor may be a dedicated device such as an ASIC or other hardware-based processor.

The controller 170 may demultiplex a stream input through the tuner unit 110, the demodulation unit 120, the external device interface unit 130, or the network interface unit 135, or may process the demultiplexed signals to generate and output a signal for image or voice output.

The display 180 may generate a driving signal by converting an image signal, a data signal, an OSD signal, a control signal processed in the controller 170, or an image signal, a data signal, a control signal, and the like received from the external device interface unit 130.

The display 180 may include a display panel (not shown) including a plurality of pixels.

The plurality of pixels provided in the display panel may include RGB sub-pixel. Alternatively, the plurality of pixels provided in the display panel may include RGBW sub-pixel. The display 180 may generate a driving signal for a plurality of pixels by converting an image signal, a data signal, an OSD signal, a control signal, etc. processed in the controller 170.

The display 180 may be a plasma display panel (PDP), a liquid crystal display (LCD), an organic light emitting diode (OLED), a flexible display, and the like, and also may be a 3D display. The 3D display 180 may be divided into a non-glasses type and a glasses type.

Meanwhile, the display 180 may be configured as a touch screen and used as an input device in addition to an output device.

The audio output unit 185 receives the voice-processed signal from the controller 170 and outputs it as a voice.

The image signal image-processed in the controller 170 may be input to the display 180, and displayed as an image corresponding to a relevant image signal. In addition, the image signal image-processed in the controller 170 may be input to an external output device through the external device interface unit 130.

The voice signal processed in the controller 170 may be audio-output to the audio output unit 185. In addition, the voice signal processed in the controller 170 may be input to an external output device through the external device interface unit 130.

Although not shown in FIG. 2, the controller 170 may include a demultiplexer, an image processing unit, and the like. This will be described later with reference to FIG. 3.

In addition, the controller 170 may control overall operations inside the image processing device 100.

For example, the controller 170 may control the tuner unit 110 to tune a broadcast corresponding to a channel selected by a user or a pre-stored channel.

In addition, the controller 170 may control the image processing device 100 according to a user command input through the user input interface unit 150 or an internal program.

Meanwhile, the controller 170 may control the display 180 to display an image. In this case, the image displayed on the display 180 may be a still image or a moving image, and may be a 2D image or a 3D image.

Meanwhile, the controller 170 may enable a certain 2D object to be displayed in an image displayed on the display 180. For example, an object may be at least one of an accessed web screen (newspaper, magazine, etc.), an electronic program guide (EPG), various menus, a widget, an icon, a still image, a moving picture, and a text.

Meanwhile, the image processing device 100 may further include a photographing unit (not shown). The photographing unit may photograph a user. The photographing unit may be implemented with a single camera, but is not limited thereto, and may be implemented with a plurality of cameras. Meanwhile, the photographing unit may be embedded in the image processing device 100 at an upper portion of the display 180 or may be separately disposed. Image information photographed by the photographing unit may be input to the controller 170.

The controller 170 may recognize the position of a user, based on the image photographed by the photographing unit. For example, the controller 170 may determine a distance (z-axis coordinate) between a user and the image processing device 100. In addition, the controller 170 may determine the x-axis coordinates and the y-axis coordinates in the display 180 corresponding to user's position.

The controller 170 may detect user's gesture based on the image photographed by the photographing unit, or each or a combination of signals detected from the sensor unit.

The power supply unit 190 may supply a corresponding power throughout the image processing device 100. In particular, it is possible to supply power to the controller 170 that can be implemented in the form of a system on chip (SOC), the display 180 for displaying an image, and the audio output unit 185 for outputting an audio, etc.

Specifically, the power supply unit 190 may include a converter (not shown) that converts AC power into DC power, and a Dc/Dc converter (not shown) that converts the level of DC power.

The remote control device 200 may transmit a user input to the user input interface unit 150. To this end, the remote control device 200 may use Bluetooth, Radio Frequency (RF) communication, Infrared Radiation communication, Ultra-wideband (UWB), ZigBee method, etc. In addition, the remote control device 200 may receive an image, a voice, or a data signal output from the user input interface unit 150, and the remote control device 200 can display or voice-output the received image, voice, or data signal.

Meanwhile, the above-described image processing device 100 may be a fixed or mobile digital broadcasting receiver capable of receiving a digital broadcasting.

Meanwhile, the block diagram of the image processing device 100 shown in FIG. 2 is just a block diagram for an embodiment of the present disclosure, and each component of the block diagram may be incorporated, added, or omitted depend on a specification of the image processing device 100 that is actually implemented.

That is, two or more components may be combined into a single component, or a single component may be subdivided into two or more components as needed. In addition, the function performed in each block is for explaining the embodiment of the present disclosure, and the specific operation or device does not limit the scope of the present disclosure.

Figure 3:
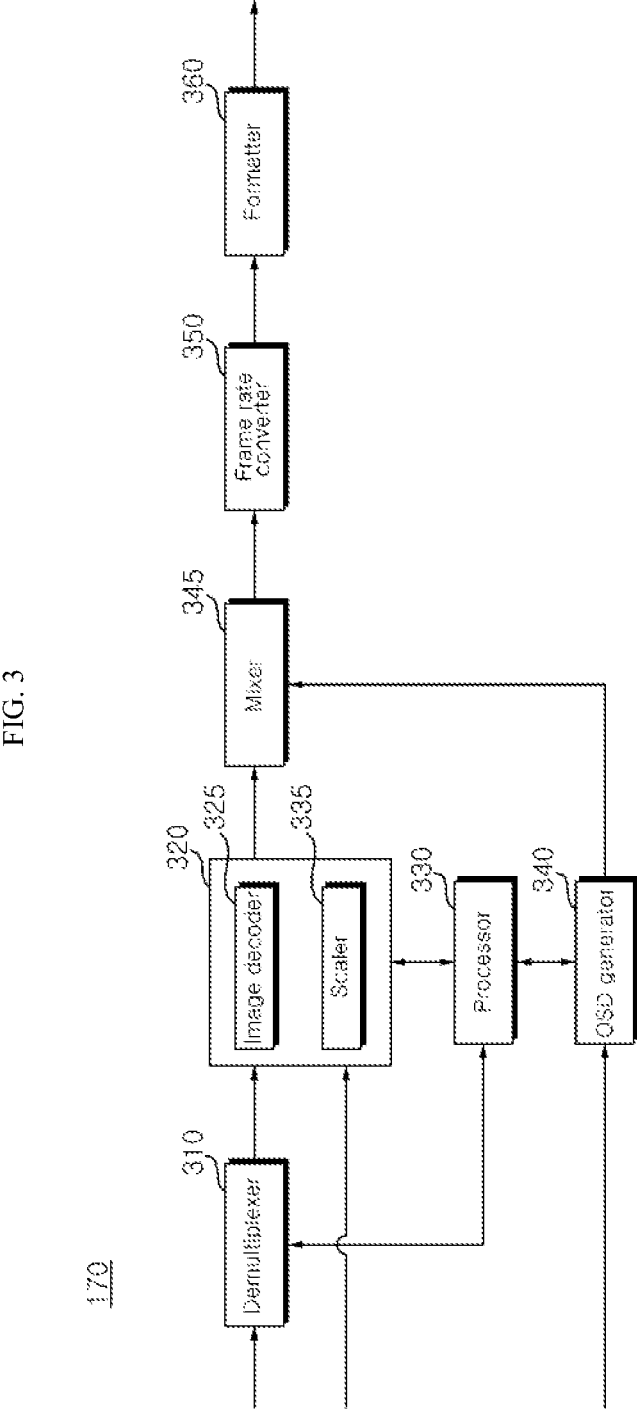
FIG. 3 is an internal block diagram of a controller of FIG. 2.

FIG. 3 is an internal block diagram of the controller of FIG. 2A.

Referring to FIG. 3, the controller 170 according to an embodiment of the present disclosure may include a demultiplexer 310, an image processing unit 320, a processor 330, an OSD generator 340, a mixer 345, a frame rate converter 350, and/or a formatter 360. In addition, an audio processing unit (not shown) and a data processing unit (not shown) may be further included.

The demultiplexer 310 may demultiplex an input stream. For example, when MPEG-2 TS is input, it can be demultiplexed and separated into image, voice, and data signal. Here, the stream signal input to the demultiplexer 310 may be a stream signal output from the tuner unit 110, the demodulation unit 120, or the external device interface unit 130.

The image processing unit 320 may perform image processing of the demultiplexed image signal. To this end, the image processing unit 320 may include an image decoder 325 and a scaler 335.

The image decoder 325 may decode the demultiplexed image signal, and the scaler 335 may perform scaling so that the resolution of the decoded image signal can be output from the display 180.

The image decoder 325 may include a decoder of various standards. For example, it may include an MPEG-2, H,264 decoder, a 3D image decoder for a color image and a depth image, a decoder for a multi-view image, and the like.

The processor 330 may control overall operations inside the image processing device 100 or the controller 170. For example, the processor 330 may control the tuner unit 110 to tune a broadcast corresponding to a channel selected by a user or a pre-stored channel.

In addition, the processor 330 may control the image processing device 100 according to a user command input through the user input interface unit 150 or an internal program.

In addition, the processor 330 may perform data transmission control with the network interface unit 135 or the external device interface unit 130.

In addition, the processor 330 may control operations of the demultiplexer 310, the image processing unit 320, the OSD generator 340, and the like inside the controller 170.

The OSD generator 340 may generate an OSD signal according to a user input or by itself. For example, a signal for displaying various types of information as a graphic or a text on the screen of the display 180 may be generated, based on a user input signal input through the input unit 160.

The generated OSD signal may include various data such as a user interface screen of the image processing device 100, various menu screens, a widget, and an icon. In addition, the generated OSD signal may include a 2D object or a 3D object.

In addition, the OSD generator 340 may generate a pointer that can be displayed on the display 180, based on a pointing signal input from the remote control device 200.

The OSD generator 340 may include a pointing signal processing unit (not shown) that generates a pointer. A pointing signal processing unit (not shown) may be provided separately instead of being provided in the OSD generator 240.

The mixer 345 may mix the OSD signal generated by the OSD generator 340 and the decoded image signal image-processed by the image processing unit 320. The mixed image signal may be provided to the frame rate converter 350.

The frame rate converter (FRC) 350 may convert a frame rate of an input image. Meanwhile, the frame rate converter 350 may output intactly, without a separate frame rate conversion.

The formatter 360 may arrange a left-eye image frame and a right-eye image frame of the frame rate-converted 3D image. In addition, it may output a synchronization signal Vsync for opening the left eye glass and the right eye glass of a 3D viewing device (not shown).

Meanwhile, the formatter 360 may convert the format of an input image signal into an image signal that is to be displayed on the display 180, and output it.

In addition, the formatter 360 may change the format of the 3D image signal. For example, it may change into any one format of various 3D formats such as Side by Side format, Top/Down format, Frame Sequential format, Interlaced format, and Checker Box format.

Meanwhile, the formatter 360 may convert a 2D image signal into a 3D image signal. For example, according to a 3D image generation algorithm, it may detect an edge or a selectable object from a 2D image signal, and separate an object according to the detected edge or the detected selectable object into a 3D image signal. In this case, as described above, the generated 3D image signal may be separated and arranged into a left-eye image signal L and a right-eye image signal R.

Meanwhile, although not shown in the drawing, it is also possible that a 3D processor (not shown) for processing a 3-dimensional effect signal is further disposed, after the formatter 360. Such a 3D processor may process brightness, tint, and color adjustment of an image signal so as to improve a 3D effect. For example, signal processing or the like that makes a near field to be clear and makes a far distance to be blurry may be performed. Meanwhile, the function of the 3D processor may be merged into the formatter 360 or integrated into the image processing unit 320.

Meanwhile, the audio processing unit (not shown) in the controller 170 may perform audio processing of the demultiplexed voice signal. To this end, the audio processing unit (not shown) may include various decoders.

In addition, the audio processing unit (not shown) in the controller 170 may process a Base, a Treble, a volume control, and the like.

A data processing unit (not shown) in the controller 170 may perform data processing of the demultiplexed data signal. For example, when the demultiplexed data signal is an encoded data signal, it can be decoded. The encoded data signal may be electronic program guide information including broadcast information such as start time and end time of a broadcast program aired on each channel.

Meanwhile, the block diagram of the controller 170 shown in FIG. 3 is only a block diagram for an embodiment of the present disclosure, and each component of the block diagram may be integrated, added, or omitted according to the specification of the controller 170 that is actually implemented.

In particular, the frame rate converter 350 and the formatter 360 may not be provided in the controller 170, but may be separately provided, or may be provided as a separate single module.

Figure 4:
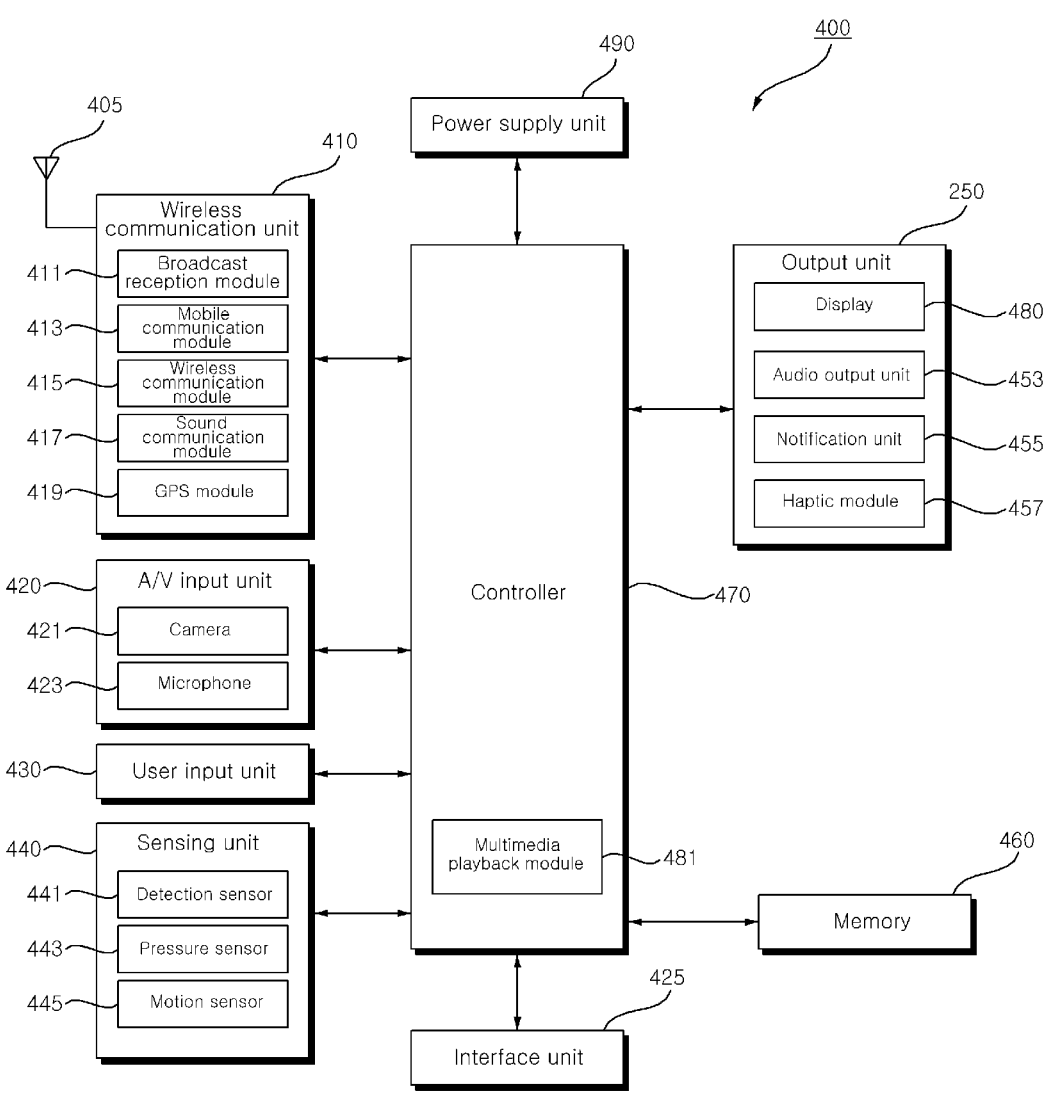
FIG. 4 is an internal block diagram of a mobile terminal of FIG. 1.

FIG. 4 is an internal block diagram of the mobile terminal of FIG. 1.

Referring to FIG. 4, the mobile terminal 400 may include a wireless communication unit 410, an audio/video (A/V) input unit 420, a user input unit 430, a sensing unit 440, an output unit 450, a memory 460, an interface unit 425, a controller 470, and/or a power supply unit 490.

Meanwhile, the wireless communication unit 410 may include a broadcast reception module 411, a mobile communication module 413, a wireless communication module 415, a sound communication unit 417, a GPS module 419, and the like.

The broadcast reception module 411 may receive a broadcast signal from an external broadcast management server through a broadcast channel. In this case, the broadcast channel may include a satellite channel, a terrestrial channel, and the like.

Broadcast data received through the broadcast reception module 411 may be stored in the memory 460.

The mobile communication module 413 may transmit/receive a wireless signal to/from at least one of a base station, an external terminal, and a server on a mobile communication network. Here, the wireless signal may include a voice call signal, a video call call signal, or various types of data according to text/multimedia message transmission/reception.

The wireless communication module 415 may mean a module for wireless Internet access, and the wireless communication module 415 may be built-in or external to the mobile terminal 400. For example, the wireless communication module 415 may perform Wi-Fi-based wireless communication or Wi-Fi Direct-based wireless communication.

In addition, as a short-distance communication technology, Bluetooth, Radio Frequency Identification (RFID), Infrared Data Association (IrDA), Ultra-Wideband (UWB), ZigBee, and the like may be used.

The sound communication unit 417 may perform sound communication. The sound communication unit 417 may add certain data to a sound that is to be output in a sound communication mode, and output the sound. In addition, the sound communication unit 417 may extract certain data from a sound received from the outside, in the sound communication mode.

The Global Position System (GPS) module 419 may receive position information from a plurality of GPS satellites.

The Audio/Video (A/V) input unit 420 is for inputting an audio signal and/or a video signal, and may include a camera 421, a microphone 423, and the like.

The user input unit 430 may generate key input data input by a user to control the operation of the terminal. To this end, the user input unit 430 may include a key pad, a dome switch, a touch pad (resistive/capacitive), and the like. In particular, when the touch pad forms a mutual layer structure with the display 480, it may be referred to as a touch screen.

The sensing unit 440 may generate a sensing signal for controlling the operation of the mobile terminal 400 by detecting the current state of the mobile terminal 400, such as the open/closed state of the mobile terminal 400, the position of the mobile terminal 400, and the presence or absence of user contact.

The sensing unit 440 may include a detection sensor 441, a pressure sensor 443, a motion sensor 445, and the like. The motion sensor 445 may detect the movement or position of the mobile terminal 400 by using an acceleration sensor, a gyro sensor, a gravity sensor, or the like. In particular, the gyro sensor is a sensor that measures angular velocity, and may detect a direction (angle) turned to a reference direction.

The output unit 450 may include a display 480, an audio output unit 453, a notification unit 455, and a haptic module 457.

The display 480 may display and output a signal processed by the mobile terminal 400.

Meanwhile, as described above, when the display 480 and the touchpad are configured as a touch screen by forming a mutual layer structure, the display 480 may also be used as an input device capable of inputting information by a user's touch in addition to an output device.

The audio output unit 453 may output audio data which is received from the wireless communication unit 410 or stored in the memory 460. Such an audio output unit 453 may include a speaker, a buzzer, and the like.

The notification unit 455 may output a signal for notifying the occurrence of an event in the mobile terminal 400. For example, the signal may be output in the form of vibration.

The haptic module 457 generates various tactile effects that a user can feel. A representative example of the tactile effect generated by the haptic module 457 is a vibration effect.

The memory 460 may store a program for processing and control by the controller 470, and perform a function for temporarily storing input or output data (e.g. phone book, message, still image, video, etc.).

The interface unit 425 functions as an interface with all external devices connected to the mobile terminal 400. The interface unit 425 may receive data or receive power from such an external device and transmit it to each component inside the mobile terminal 400, and may enable the data inside the mobile terminal 400 to be transmitted to an external device.

The controller 470 generally controls the operation of each component provided in the mobile terminal 100 to control the overall operation of the mobile terminal 400. For example, it may perform a relevant control and processing for voice call, data communication, video call, and the like. In addition, the controller 470 may include a multimedia playback module 481 for multimedia playback. The multimedia playback module 481 may be configured as hardware inside the controller 470, or may be configured as software separately from the controller 470.

The power supply unit 490 receives external power and internal power under the control of the controller 470 to supply power required for operation of each component.

Meanwhile, the block diagram of the mobile terminal 400 shown in FIG. 4 is a block diagram for an embodiment of the present disclosure. Each component in the block diagram may be integrated, added, or omitted according to the specification of the mobile terminal 400 that is actually implemented. That is, if necessary, two or more components may be combined into a single component, or a single component may be subdivided into two or more components. In addition, the function performed in each block is for explaining the embodiment of the present disclosure, and the specific operation or device does not limit the scope of the present disclosure.

Figure 5:
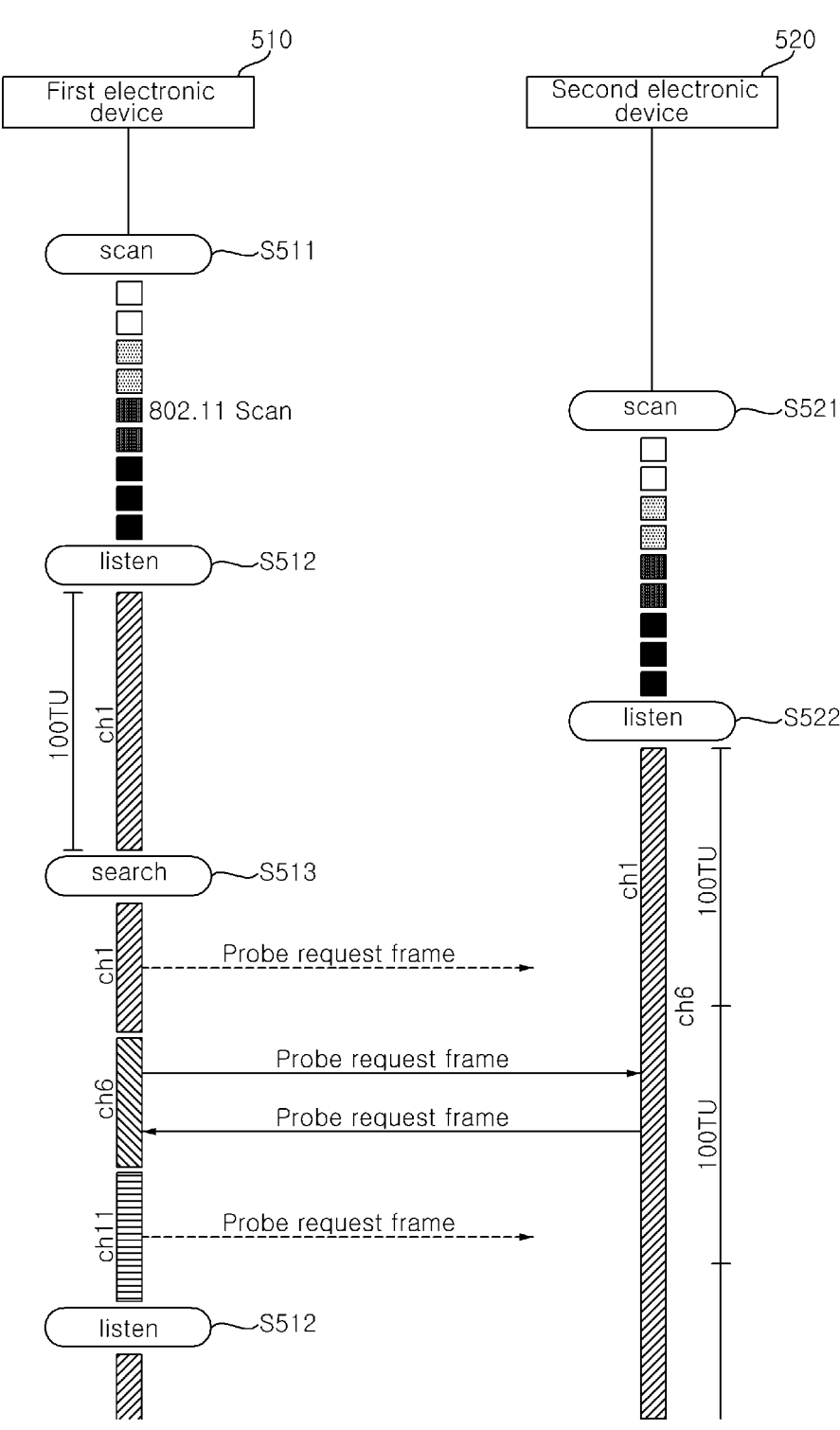
FIG. 5 is a flowchart of a conventional method for searching an external device.

FIG. 5 is a flowchart of a conventional method of searching an external device. FIG. 5 illustrates an operation between a first electronic device 510 (e.g. the image display apparatus 100) and a second electronic device 520 (e.g. the mobile terminal 400).

Referring to FIG. 5, the process of searching an external device may be divided into a scan phase (S511, S521) and a find phase (S512, S513, S522).

The scan phase (S511, S521) may include an operation of scanning all available wireless channels by the first electronic device 510 and the second electronic device 520 according to the 802.11 method, which enables to determine the best operating channel.

The find phase (S512, S513, S522) may include a search mode (S512) and a listen mode (S512, S522), and the first electronic device 510 and the second electronic device 520 may alternately repeat the search mode (S513) and the listen modes (S512, S522). In this figure, it is illustrated that only the first electronic device 510 alternately repeats the search mode (S513) and the listen mode (S512), but the second electronic device 520 may also repeat the listen mode (S522) and the search mode, and for convenience of description, the operation will be described based on the first electronic device 510.

The first electronic device 510 may perform active search by transmitting a probe request frame in the search mode (S513). In this case, the first electronic device 510 may limit the search range to a social channel of channels 1, 6, and 11 (2412, 2437, 2462 MHz) for fast search.

The first electronic device 510 may select only one channel (e.g. channel 1) from among three social channels in the listen mode (S512) to maintain the reception state of the probe request frame. At this time, the time of the listen mode (S512, S522) may be set (e.g. 100, 200, 300 Time Unit (TU)) in various ways.

When the probe request frame transmitted by the second electronic device 520 in the search mode is received through a channel (e.g. channel 1) maintaining the reception state, the first electronic device 510 may transmit a probe response frame, in response to the reception of the probe response frame.

As described above, the first electronic device 510 and the second electronic device 520 may discover a counterpart device in a common channel (e.g. channel 1) used by both the first electronic device 510 and the second electronic device 520, while transmitting/receiving a probe request frame when continuously repeating the search mode and a reception mode.

That is, in order for the first electronic device 510 and the second electronic device 520 to discover each other, they must operate in a different mode (listen mode and search mode) in a common channel at a same time point, but are unable to find each other, while the first electronic device 510 and the second electronic device 520 operate in the same mode, or do not use a common channel, thereby having no choice but to search a counterpart device while repeating the listen mode and the search mode.

Accordingly, according to the conventional method of searching an external device, the time required for the operation of searching whether an external device, which is a target of establishing a communication connection, exists in the vicinity may increase, which may cause inconvenience to a user.

FIGS. 6 to 9 are flowcharts of a method of operating an image display apparatus according to various embodiments of the present disclosure.

Figure 6:
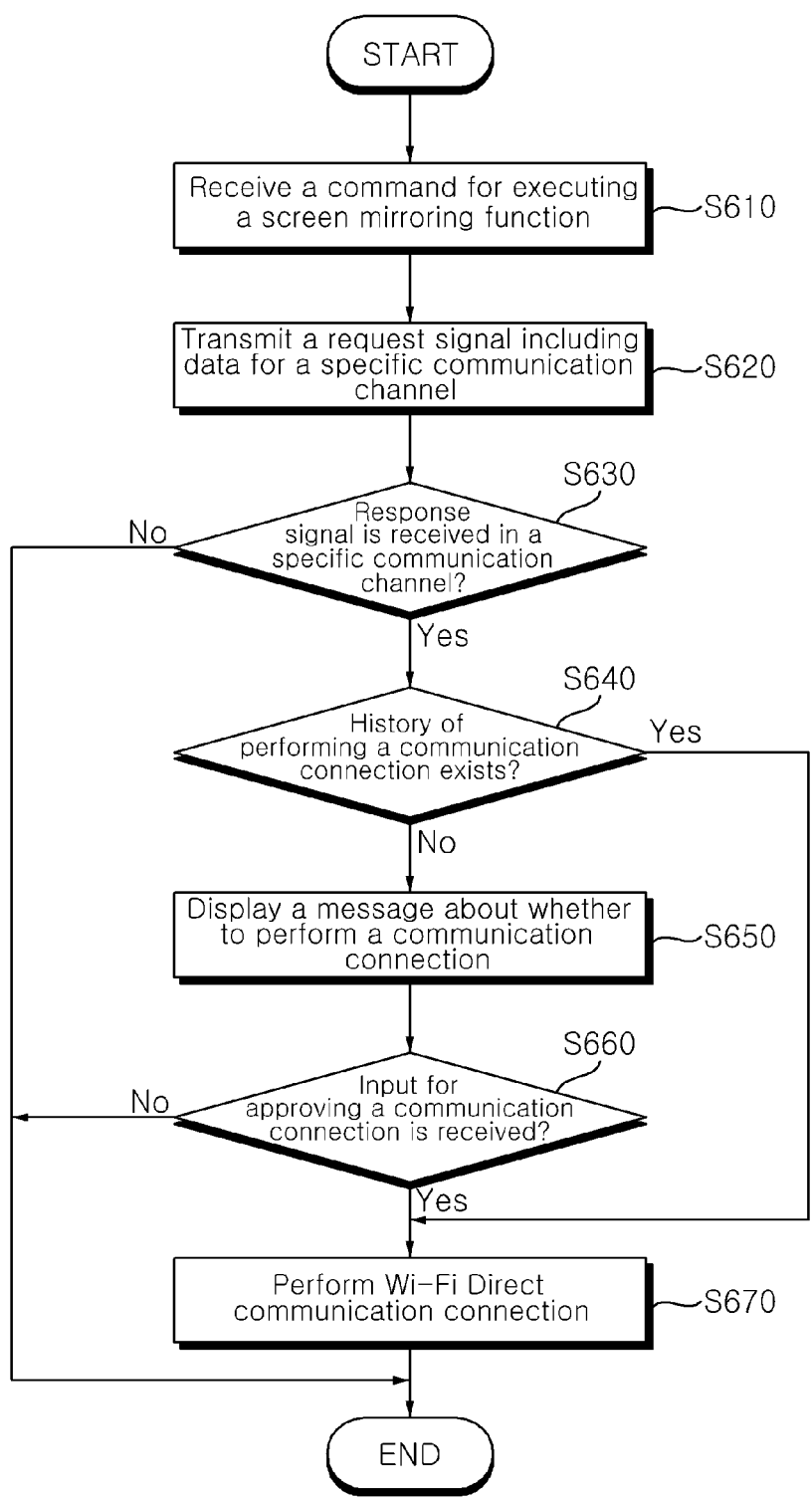
FIGS. 6 to 9 are flowcharts of a method of operating an image display apparatus according to various embodiments of the present disclosure.

Referring to FIG. 6, the image display apparatus 100 may receive a command for executing a communication connection of Wi-Fi Direct method, at operation S610.

For example, the image display apparatus 100 may receive a command for executing a screen mirroring function, based on a user input received through the input unit 160 or a user input signal received from the remote control device 200.

At operation S620, the image display apparatus 100 may transmit a request signal including data for a specific communication channel to the outside according to various methods. In this case, the specific communication channel may be, for example, any one of social channels of channels 1, 6, and 11 (2412, 2437, 2462 MHz) in a listen mode.

For example, the image display apparatus 100, via the access point (AP), may transmit a request signal including data for a specific communication channel to an external device (e.g. the mobile terminal 400) communicatively connected to a local network provided by the access point (AP).

For example, the image display apparatus 100 may transmit a request signal including data for a specific communication channel, through a Bluetooth method, to an external device (e.g. the mobile terminal 400) that is paired and communicatively connected through a Bluetooth method.

For example, the image display apparatus 100 may contain data for a specific communication channel into a BLE signal, and transmit in a broadcasting method.

Meanwhile, the image display apparatus 100 may contain data for an identifier of the image display apparatus 100 into a request signal and transmit. Here, the identifier of the image display apparatus 100 may be a P2P device address of the image display apparatus 100.

At operation S630, the image display apparatus 100 may check whether a response signal to a request signal is received in a specific communication channel. Here, the response signal may include, for example, at least one of data contained in a probe response frame.

At operation S640, when a response signal to a request signal is received, the image display apparatus 100 may check whether there exists a history of performing a communication connection of Wi-Fi Direct method with an external device (e.g. the mobile terminal 400) that transmitted the response signal.

For example, the image display apparatus 100 may check whether there exists a history of performing a communication connection of Wi-Fi Direct method with an external device (e.g. the mobile terminal 400) that transmitted the response signal, based on an identifier (e.g. P2P Device Address), which is stored in the storage unit 140, for at least one external device that performed a communication connection of Wi-Fi Direct method.

At operation S650, the image display apparatus 100 may output a message about whether to perform a communication connection of Wi-Fi Direct method, when there exists no history of performing a communication connection of Wi-Fi Direct method with an external device (e.g. the mobile terminal 400) that transmitted a response signal.

For example, the image display apparatus 100 may display a message informing a user of whether to establish a communication connection of Wi-Fi Direct method with an external device (e.g. the mobile terminal 400) that transmitted a response signal, through the display 180, or voice-output the message through the audio output unit 185.

At operation S660, the image display apparatus 100 may check whether a user input for approving a communication connection of Wi-Fi Direct method with an external device (e.g. the mobile terminal 400) that transmitted a response signal is received.

For example, the image display apparatus 100 may receive a user input that approves a communication connection of Wi-Fi Direct method, based on a user input received through the input unit 160 or a user input signal received from the remote control device 200.

At operation S670, the image display apparatus 100 may perform a communication connection of Wi-Fi Direct method with an external device (e.g. the mobile terminal 400) that transmitted a response signal, when there exists a history of performing a communication connection of Wi-Fi Direct method with an external device (e.g. the mobile terminal 400) that transmitted the response signal, or when a user input that approves a communication connection of Wi-Fi Direct method is received.

The image display apparatus 100 may perform a GO negotiation (Group Owner Negotiation) step for configuring a Basic Service Set (BSS) with an external device (e.g. the mobile terminal 400) that transmitted the response signal, and a Wi-Fi Protected Setup (WPS) step.

Here, the GO negotiation step may refer to a step of determining the roles of two devices as a P2P group owner or a P2P client, respectively, and setting an operating channel to be used inside the P2P group.

The device determined as the P2P group owner may allocate a P2P interface address which is an identifier used inside the P2P group, and determine an operation channel to be used inside the P2P group.

The image display apparatus 100 may be determined as a P2P group owner, and may determine an operation channel to be used inside the P2P group. In this case, the image display apparatus 100 may determine an operation channel to be used inside the P2P group, according to whether the image display apparatus 100 can simultaneously transmit and receive Wi-Fi signals of a different frequency band.

When the image display apparatus 100 cannot simultaneously transmit and receive a Wi-Fi signal of a 2.4 GHz band and a Wi-Fi signal of a 5 GHz band, it may determine a communication channel of a frequency band currently being used by the image display apparatus 100 as an operation channel to be used inside the P2P group.

When the image display apparatus 100 cannot simultaneously transmit and receive a Wi-Fi signal of a 2.4 GHz band and a Wi-Fi signal of a 5 GHz band, it may determine as an operation channel to be used inside the P2P group, according to the frequency band currently being used by the image display apparatus 100.

For example, when the image display apparatus 100 transmits and receives signals to and from the access point (AP) through the 2.4 GHz band, the image display apparatus 100 may determine the communication channel of the 5 GHz band as the operating channel to be used inside the P2P group.

Meanwhile, for example, when the image display apparatus 100 transmits and receives signals to and from the access point (AP) through the 5 GHz band, the image display apparatus 100 may determine the communication channel of the 2.4 GHz band as the operating channel to be used inside the P2P group.

Alternatively, for example, when the image display device 100 transmits and receives a signal to and from the access point (AP) through the 5 GHz band, the image display apparatus 100 may determine the communication channel of the 5 GHz band as the operating channel to be used inside the P2P group. In this case, the image display apparatus 100 may perform communication with an access point (AP) and communication with an external device (e.g. the mobile terminal 400) through a time division method.

Meanwhile, the image display apparatus 100 may determine an operation channel to be used inside the P2P group, according to whether the mobile terminal 400 can simultaneously transmit and receive Wi-Fi signals of a different frequency band.

For example, when the mobile terminal 400 cannot simultaneously transmit and receive Wi-Fi signals of a different frequency band, and transmits and receives signals to and from the access point (AP) through a 5 GHz band, the image display apparatus 100 may determine the communication channel of the 5 GHz band being used by the mobile terminal 400 as an operating channel to be used inside the P2P group.

Figure 7:
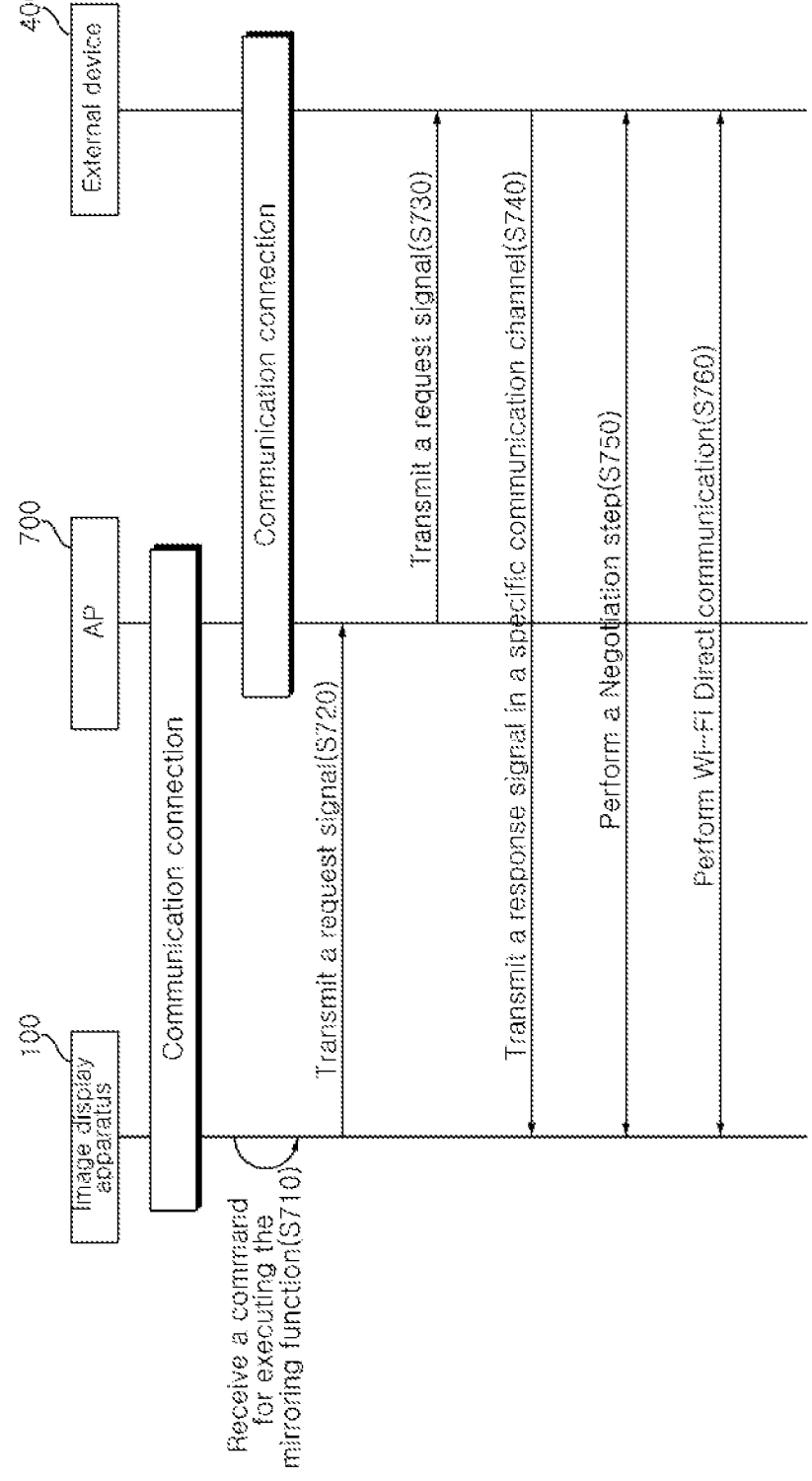

FIG. 7 is a flowchart of an operation method of transmitting a request signal via an access point (AP) according to an embodiment of the present disclosure. A detailed description of the content overlapping with the content described in FIG. 6 will be omitted.

Referring to FIG. 7, it can be checked that the image display apparatus 100 and an external device (e.g. the mobile terminal 400) are communicatively connected to a local network provided by the access point (AP).

The image display apparatus 100 may receive a command for executing the screen mirroring function, at operation S710.

The image display apparatus 100 may transmit a request signal including data for a specific communication channel to the access point AP, at operation S720, and the access point AP transmits a request signal to an external device (e.g. the mobile terminal 400), at operation S730.

That is, data for a specific communication channel output from the image display apparatus 100 may be transmitted to the external device (e.g. the mobile terminal 400) via the access point (AP).

The external device (e.g. the mobile terminal 400) may transmit a response signal to the request signal to the image display apparatus 100, through a specific communication channel, at operation S740. In this case, the image display apparatus 100 may check whether a response signal is received in a specific communication channel.

The image display apparatus 100 and the external device (e.g. the mobile terminal 400) may perform a GO negotiation step, at operation S750. In this case, the image display apparatus 100 and the external device (e.g. the mobile terminal 400) may set an operation channel to be used inside the P2P group.

The image display apparatus 100 and the external device (e.g. the mobile terminal 400) may communicate with each other through a communication channel set as an operation channel, at operation S760.

For example, the image display apparatus 100 may display an image displayed on the screen of the external device (e.g. the mobile terminal 400) intactly through the display 170, based on the image data received from the external device (e.g. the mobile terminal 400).

Figure 8:
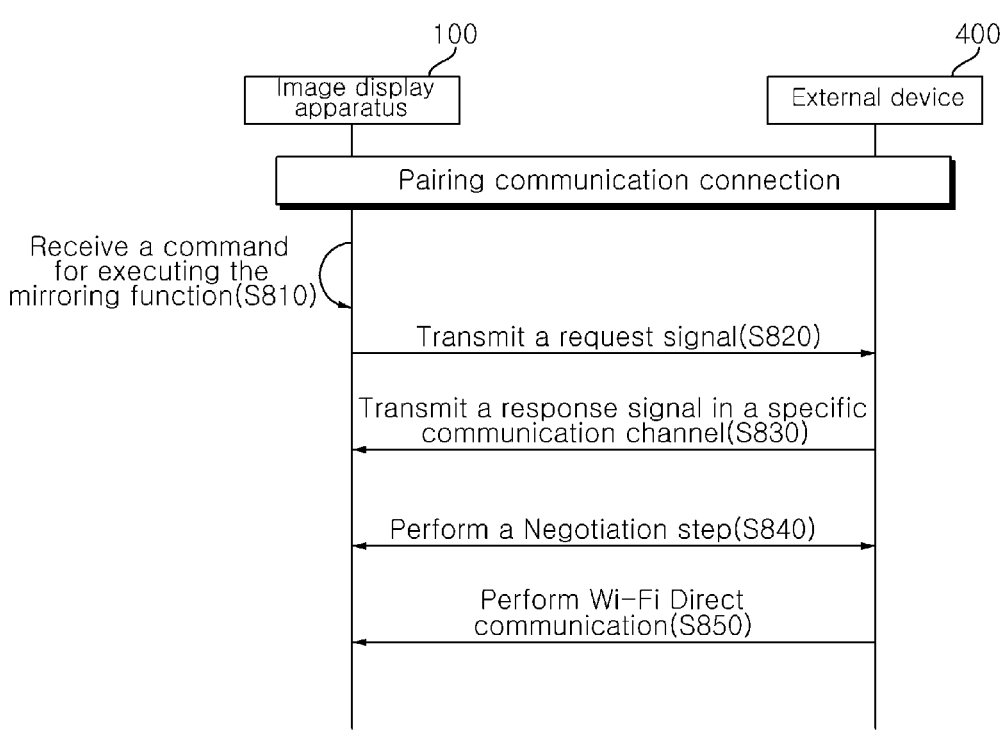

FIG. 8 is a flowchart of an operation method of transmitting a request signal to a paired external device through a communication method different from the Wi-Fi Direct method, according to an embodiment of the present disclosure. A detailed description of the content overlapping with the content described in FIG. 6 will be omitted.

Referring to FIG. 8, it can be checked that the image display apparatus 100 and the external device (e.g. the mobile terminal 400) are in a pairing communicatively connected state. In this case, the image display apparatus 100 and the external device (e.g. the mobile terminal 400) may be paired through a communication method (e.g. Bluetooth) different from the Wi-Fi Direct method.

The image display apparatus 100 may receive a command for executing the screen mirroring function, at operation S810.

At operation S820, the image display apparatus may transmit a request signal including data for a specific communication channel to an external device (e.g. the mobile terminal 400), in a communication method (e.g. Bluetooth) used for pairing communication connection.

That is, the image display apparatus 100 may directly transmit data for a specific communication channel to the external device (e.g. the mobile terminal 400) through a communication channel being used in pairing communication.

The external device (e.g. the mobile terminal 400) may transmit a response signal to the request signal, to the image display apparatus 100 through a specific communication channel, at operation S830. In this case, the image display apparatus 100 may check whether a response signal is received in a specific communication channel.

The image display apparatus 100 and the external device (e.g. the mobile terminal 400) may perform a GO negotiation step, at operation S840. In this case, the image display apparatus 100 and the external device (e.g. the mobile terminal 400) may set an operation channel to be used inside the P2P group.

The image display apparatus 100 and the external device (e.g. the mobile terminal 400) may communicate with each other through a communication channel set as the operation channel, at operation S850.

Figure 9:
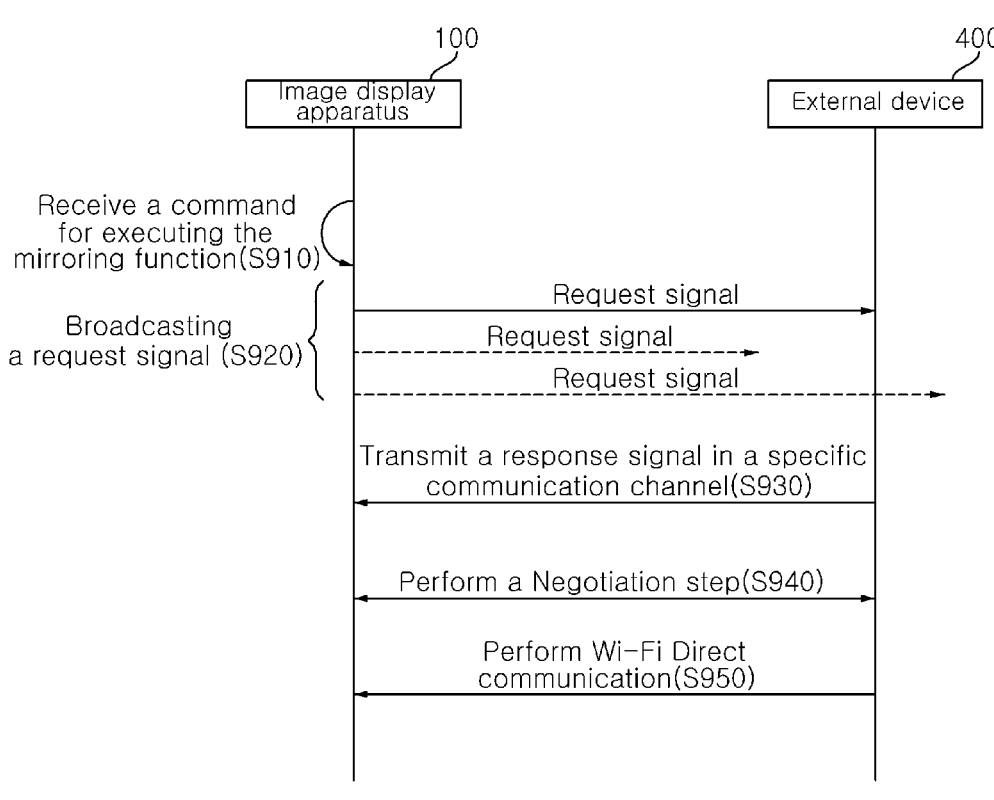

FIG. 9 is a flowchart of an operation method of transmitting a request signal in a broadcasting manner according to an embodiment of the present disclosure. A detailed description of the content overlapping with the content described in FIGS. 6 and 7 will be omitted.

Referring to FIG. 9, the image display apparatus 100 may receive a command for executing a screen mirroring function, at operation S910.

At operation S920, the image display apparatus 100 may transmit a request signal including data for a specific communication channel in a broadcasting manner. For example, the image display apparatus 100 may include data for a specific communication channel in a BLE type request signal, and transmit in a broadcasting manner.

The external device (e.g. the mobile terminal 400) that received the BLE type request signal may transmit a response signal to the request signal to the image display apparatus 100, through a specific communication channel, at operation S830. In this case, the image display apparatus 100 may check whether a response signal is received in a specific communication channel.

The image display apparatus 100 and the external device (e.g. the mobile terminal 400) may perform a GO negotiation step, at operation S840. In this case, the image display apparatus 100 and the external device (e.g. the mobile terminal 400) may set an operation channel to be used inside the P2P group.

The image display apparatus 100 and the external device (e.g. the mobile terminal 400) may communicate with each other through a communication channel set as the operation channel, at operation S850.

Figure 10:
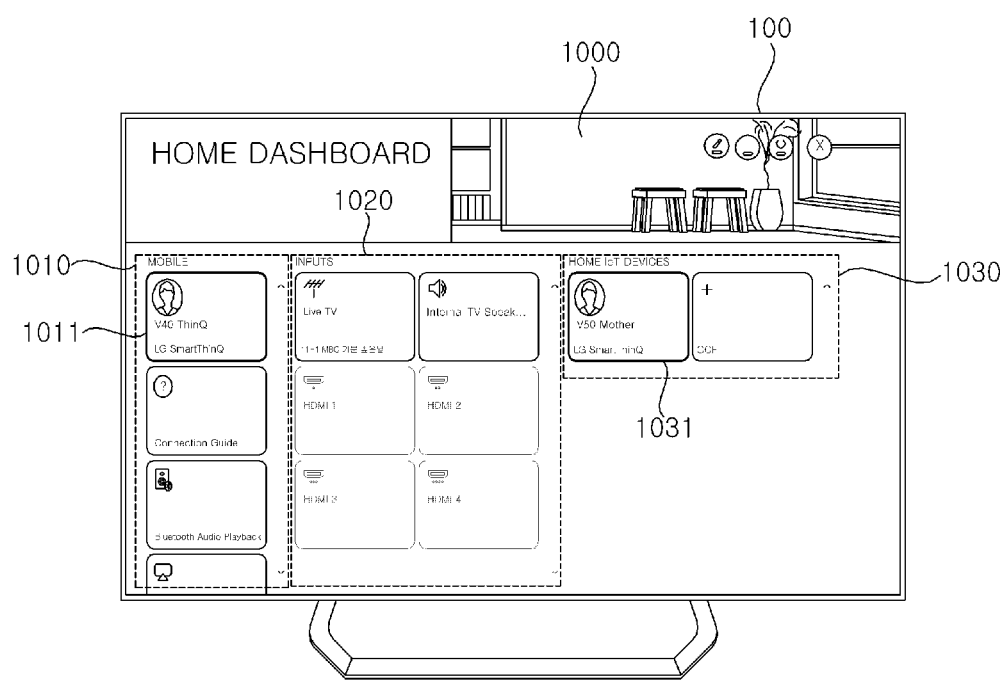
FIGS. 10 to 12B are diagrams for explaining the method of operating an image display apparatus.
Figure 10:
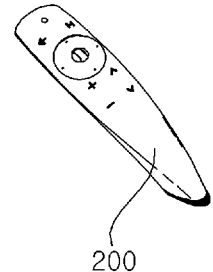

FIG. 10 is a diagram illustrating a home screen displayed on an image display apparatus.

Referring to FIG. 10, on a home screen 1000 of the image display apparatus 100, information 1010 related to at least one mobile terminal 400 capable of communicating with the image display apparatus 100 may be displayed.

For example, the information 1010 related to the mobile terminal 400 may include information related to a device which is paired and communicatively connected through a Bluetooth method or the like, or information related to a device capable of communicating through a local network.

On the home screen 1000 of the image display apparatus 100, information 1020 related to various input/output units provided in the image display apparatus 100 may be displayed. For example, the information 1020 related to the input/output unit may include information related to the broadcast receiving unit 105, the A/V input/output unit, the audio output unit 185, and the like.

On the home screen 1000 of the image display apparatus 100, information 1030 related to a device connected through an Internet of Things (IoT) application may be displayed. For example, the information 1030 related to a device connected through an IoT application may include information 1031 related to the mobile terminal, or various home appliances such as a robot cleaner, an air conditioner, an air purifier, a washing machine, and a refrigerator.

The image display apparatus 100 may receive a user input for selecting a specific object 1011 from the information 1010 related to the mobile terminal 400 displayed on the home screen 1000 of the image display apparatus 100. In this case, a user may select a specific object 1011 through the remote control device 200, or select a specific object 1011 through the input unit 160 (e.g. a touch screen) provided in the image display apparatus 100.

Meanwhile, the image display apparatus 100 may determine that a command for executing a screen mirroring function with the mobile terminal 400 corresponding to the specific object 1011 selected by a user is received, and may perform a communication connection of Wi-Fi Direct method with the mobile terminal 400 corresponding to the specific object 1011.

Figure 11:
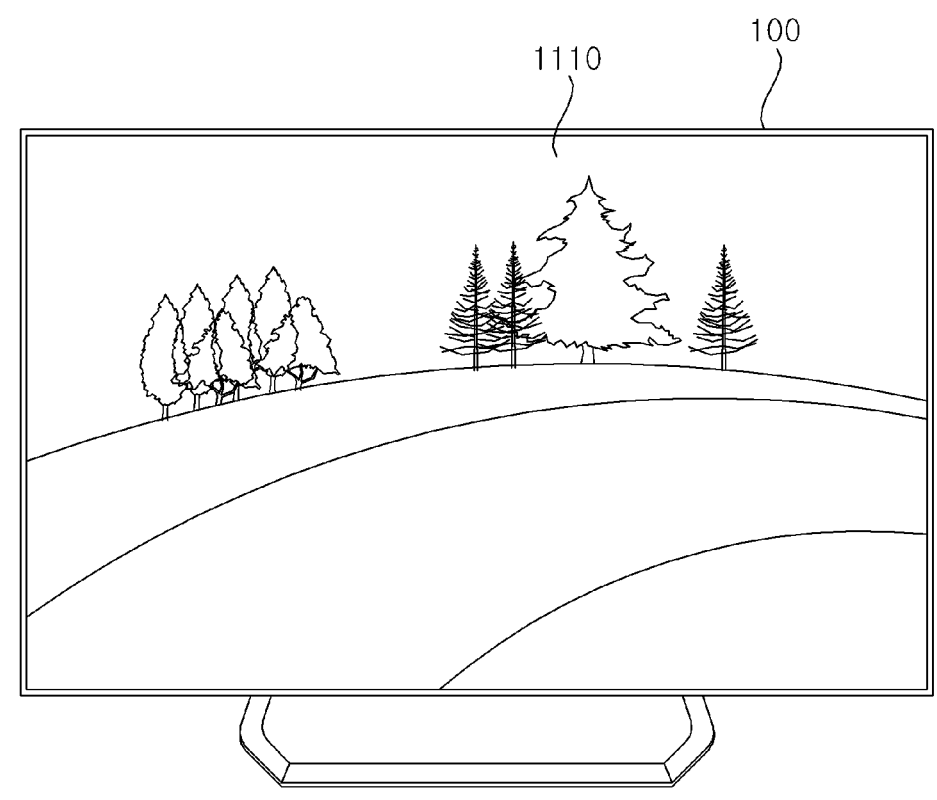
Figure 11:
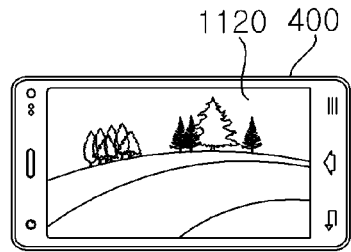
Figure 12A:
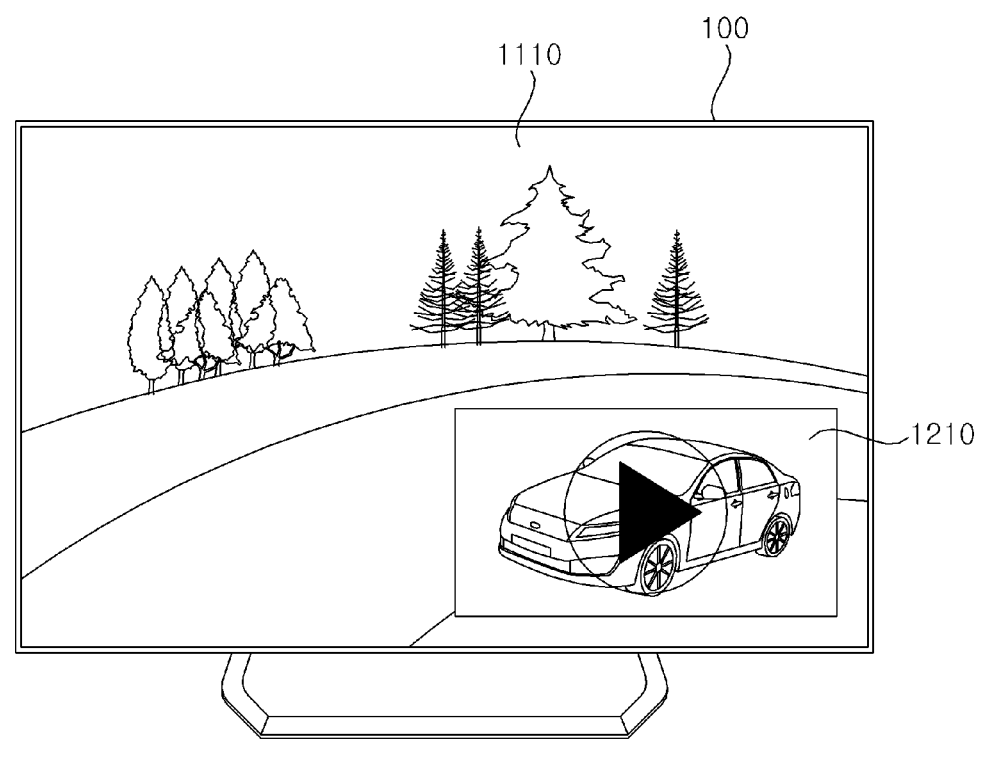
Figure 12A:
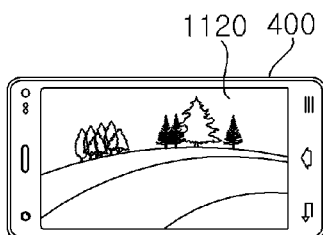
Figure 12B:
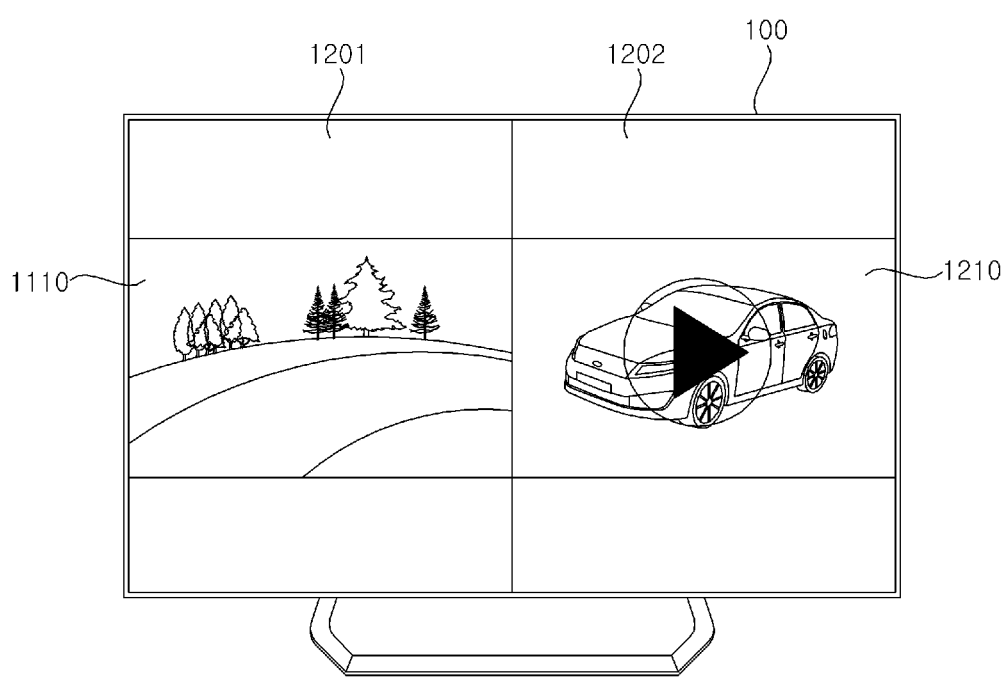
Figure 12B:
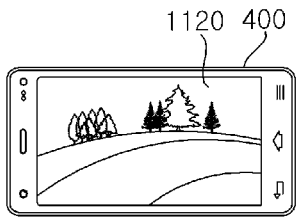

FIGS. 11 to 12B are diagrams illustrating a screen displayed on an image display apparatus and a mobile terminal, when a screen mirroring function is executed.

Referring to FIG. 11, the image display apparatus 100 establishing the communication connection of Wi-Fi Direct method with the mobile terminal 400 may receive data on the image displayed on a screen 1120 of the mobile terminal 400 from the mobile terminal 400, and display the received data intactly through the display 170.

At this time, the image display apparatus 100 may display a screen 1110 which is an enlarged screen 1120 of the mobile terminal 400 through the display 170, based on the resolution, aspect ratio, etc. of the display 170.

Meanwhile, referring to FIGS. 12A and 12B, the image display apparatus 100 displays the screen 1110 which is an enlarged screen 1120 of the mobile terminal 400 through the display 170, and may display a screen 1210 for an image received through a network together.

At this time, as shown in FIG. 12, a screen 1210 for an image received through a network may be displayed together on one area of the screen 1110 which is an enlarged screen 1120 of the mobile terminal 400, as shown in FIG. 12B, the screen 1110 which is an enlarged screen 1120 of the mobile terminal 400 is displayed on one area 1201 of the display 170, and a screen 1210 for an image received through a network may be displayed on another area 1202 of the display 170.

Meanwhile, the image display apparatus 100 may receive data for an image from the access point (AP) through a network communication channel of a 2.4 GHz band in a streaming manner, while receiving data for the image displayed on the screen 1120 of the mobile terminal 400 from the mobile terminal 400 in a Wi-Fi Direct method through a communication channel of the 5 GHz band.

Alternatively, the image display apparatus 100 may receive data on the image displayed on the screen 1120 of the mobile terminal 400 by using the same frequency band, and data on the image received in a streaming manner, through a time division method.

As described above, according to various embodiments of the present disclosure, without searching whether an external device (e.g. the mobile terminal 400) exists in the vicinity, data for a specific communication channel is transmitted to the external device by using various communication methods, it is possible to establish a communication connection of Wi-Fi Direct method with the external device, by receiving a response signal from the external device through a specific communication channel, thereby effectively reducing the time required to establish a communication connection with an external device.

In addition, since the image display apparatus 100 simultaneously transmits and receives Wi-Fi signals of a different frequency band, communication with the external device (e.g. the mobile terminal 400) and communication with the access point (AP) can be performed without degradation of communication performance.

The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

Meanwhile, the method of operating an image display apparatus of the present disclosure can be implemented as computer readable codes on a medium on which a program is recorded. The computer readable medium includes all kinds of recording apparatuses in which data that can be read by a computer system is stored. Examples of the recording medium readable by the processor include a ROM, a RAM, a CD-ROM, a magnetic tape, a floppy disk, an optical data storage device, and the like, and may also be implemented in the form of a carrier wave such as transmission over the Internet. In addition, the processor-readable recording medium may be distributed over network-connected computer systems so that code readable by the processor can be stored and executed in a distributed fashion.

In addition, although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

The invention claimed is:

1. An image display apparatus comprising:
a display configured to display an image;
an interface unit comprising at least one transceiver;
a controller configured to:
control the interface unit to transmit a request signal including data for how any other device is to communicate with the image display apparatus via a Wi-Fi Direct method,
wherein the request signal is transmitted using at least one communication method other than the Wi-Fi Direct method, monitor a specific communication channel that is used in the Wi-Fi Direct method to determine whether a response signal to the request signal is received by the interface unit via the specific communication channel, the specific communication channel having been identified in the request signal, and
based on the response signal being received in the specific communication channel used in the Wi-Fi Direct method, perform a communication connection of the Wi-Fi Direct method with an external device that transmitted the response signal in reply to the request signal.

2. The image display apparatus of claim 1, wherein the external device is a device communicatively connected to an access point to which the image display apparatus is communicatively connected through the at least one communication method different from the Wi-Fi Direct method,
wherein the controller is configured to:
transmit the request signal to the external device, via the access point.

3. The image display apparatus of claim 1, wherein the external device is a device which is paired with and communicatively connected to the image display apparatus through the at least one communication method different from the Wi-Fi Direct method,
wherein the controller is configured to:
transmit the request signal through the at least one communication method different from the Wi-Fi Direct method.

4. The image display apparatus of claim 1, wherein the controller is configured to:
broadcast the request signal through the at least one communication method different from the Wi-Fi Direct method.

5. The image display apparatus of claim 1, wherein the controller is configured to:
based on there being a history of performing the communication connection of the Wi-Fi Direct method with the external device, based on the response signal being received in the specific communication channel, perform the communication connection of the Wi-Fi Direct method with the external device, and
based on there being no history of performing the communication connection of the Wi-Fi Direct method with the external device, display a message indicating whether to perform the communication connection of the Wi-Fi Direct method, through the display.

6. The image display apparatus of claim 5, wherein the request signal comprises an identifier of the image display apparatus.

7. The image display apparatus of claim 6, wherein the identifier is a P2P Device Address for the image display apparatus.

8. The image display apparatus of claim 1, wherein the at least one transceiver comprises a first circuit for transmitting and receiving a Wi-Fi signal of a 2.4 GHz band and a second circuit for transmitting and receiving a Wi-Fi signal of a 5 GHz band,
wherein the controller is configured to simultaneously transmit and receive Wi-Fi signals of a different frequency band, through the first circuit and the second circuit, respectively.

9. The image display apparatus of claim 8, wherein, based on communicating with an access point through the first circuit, the controller is configured to perform a communication of the Wi-Fi Direct method with the external device through the second circuit.

10. The image display apparatus of claim 9, wherein, based on communicating with the access point through the second circuit, the controller is configured to perform a communication with the access point and a communication with the external device through the second circuit, through a time division method.

11. A method of operating an image display apparatus, the method comprising:

transmitting a request signal including data for how any other device is to communicate with the image display apparatus via a Wi-Fi Direct method, wherein the request signal is transmitted using at least one communication method other than the Wi-Fi Direct method, monitoring a specific communication channel that is used in the Wi-Fi Direct method to determine whether a response signal to the transmitted request signal is received via the specific communication channel, the specific communication channel having been identified in the request signal; and based on the response signal being received in the specific communication channel used in the Wi-Fi Direct method, performing a communication connection of the Wi-Fi Direct method with an external device that transmitted the response signal in reply to the request signal.

12. The method of claim 11, wherein the external device is a device communicatively connected to an access point to which the image display apparatus is communicatively connected through the at least one communication method different from the Wi-Fi Direct method, wherein transmitting the request signal comprises transmitting the request signal to the external device, via the access point.

13. The method of claim 11, wherein the external device is a device which is paired with and communicatively connected to the image display apparatus through the at least one communication method different from the Wi-Fi Direct method, wherein transmitting the request signal comprises transmitting the request signal through the at least one communication method different from the Wi-Fi Direct method.

14. The method of claim 11, wherein transmitting the request signal comprises broadcasting the request signal through the at least one communication method different from the Wi-Fi Direct method.

15. The method of claim 11, wherein performing the communication connection of the Wi-Fi Direct method comprises:

based on there being a history of performing the communication connection of the Wi-Fi Direct method with the external device, based on the response signal being received in the specific communication channel, performing the communication connection of the Wi-Fi Direct method with the external device; and based on there being no history of performing the communication connection of the Wi-Fi Direct method with the external device, displaying a message indicating whether to perform the communication connection of the Wi-Fi Direct method, through the display.

16. The method of claim 15, wherein the request signal comprises an identifier of the image display apparatus.

17. The method of claim 16, wherein the identifier is a P2P Device Address for the image display apparatus.

18. The method of claim 11, wherein performing the communication connection of the Wi-Fi Direct method comprises performing the communication connection of the Wi-Fi Direct method with the external device, through a second circuit that transmits and receives a Wi-Fi signal of a 5 GHz band, based on the image display apparatus communicating with an access point through a first circuit that transmits and receives a Wi-Fi signal of a 2.4 GHz band.

19. The method of claim 18, wherein performing the communication connection of the Wi-Fi Direct method comprises performing a communication with the access point and a communication with the external device through the second circuit, through a time division method, based on the image display apparatus communicating with the access point through the second circuit.

* * * * *